Dec. 9, 1958   G. HAMPRECHT ET AL   2,863,730
METHOD OF CARRYING OUT HIGH TEMPERATURE
REACTIONS IN SHAFT FURNACES
Filed Feb. 14, 1955
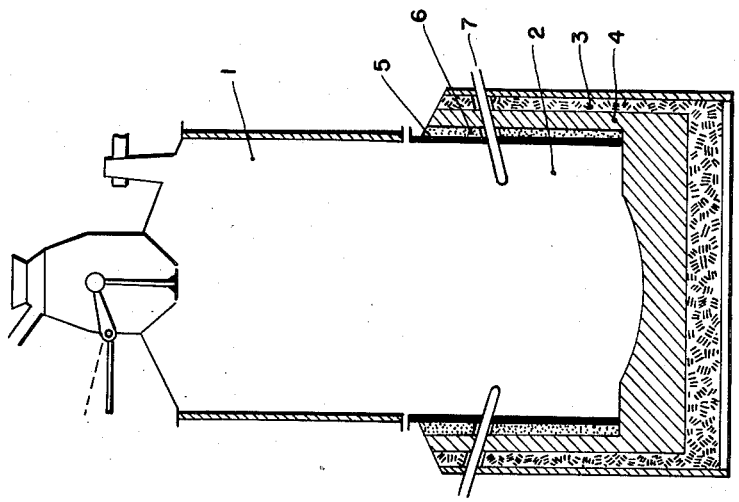
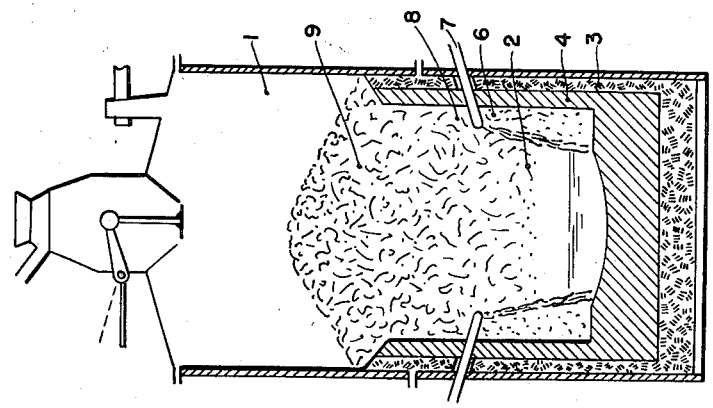
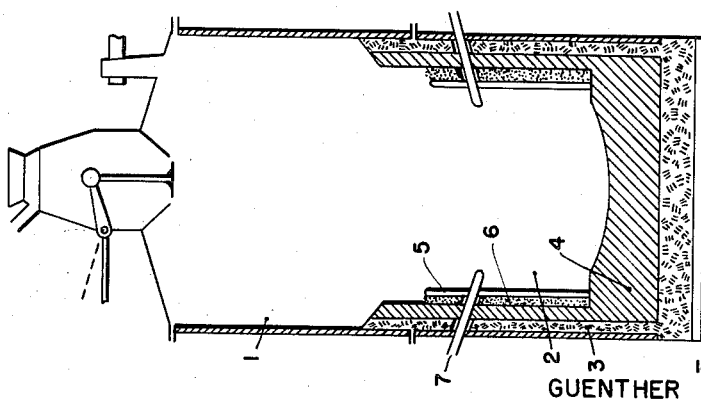
INVENTORS:
GUENTHER HAMPRECHT
ADAM IMMEL
HANS GETTERT
BY
Margall, Johnston, Cook & Root
ATT'YS

United States Patent Office 2,863,730
Patented Dec. 9, 1958

2,863,730

METHOD OF CARRYING OUT HIGH TEMPERATURE REACTIONS IN SHAFT FURNACES

Guenther Hamprecht, Limburgerhof, Pfalz, and Adam Immel and Hans Gettert, Ludwigshafen (Rhine), Germany, assignors to Badische Anilin- & Soda-Fabrik Aktiengesellschaft, Ludwigshafen (Rhine), Germany Application February 14, 1955, Serial No. 487,966

Claims priority, application Germany February 16, 1954

8 Claims. (Cl. 23—208)

This invention relates to improvements in carrying out high temperature reactions in shaft furnaces provided with nozzles for supplying oxygen or air enriched with oxygen.

The operation of shaft furnaces with oxygen or air enriched with oxygen is rendered difficult by reason of the fact that the materials conventionally used as linings are not stable to the high temperatures occurring. As lining bricks only carbon bricks come into question in practice, but these are very sensitive to oxidizing gases and have an undesirably high thermal conductivity. Consequently it is necessary to leave, between the wall of the furnace and the mouthpiece of the nozzle for the supply of oxygen or air enriched with oxygen, a large intermediate space which is filled with charge material, i. e. the nozzle projects deeply into the charge of the furnace. This intermediate space, however, necessitates quite a considerable enlargement of the furnace as compared with the reaction space necessary for the reaction. Moreover the nozzles must be of very strong construction in order to withstand the considerable weight load of the charge. The necessary intensive cooling of the nozzles has the consequence, when there is a great depth of projection of the same, that the cooling water withdraws heat in an undesirable way from the hottest zone of the furnace. Moreover the great depth of projection of the nozzle into the charge often renders very difficult replacement of the nozzles.

These disadvantages in carrying out in shaft furnaces reactions which proceed at high temperatures with nozzles which project into the interior of the furnace, for example for the production of calcium carbide, phosphorus, iron alloys, can be avoided to a great extent according to the present invention by arranging in the space between the inner wall of the furnace and the mouths of the nozzles a layer of finely divided material of poor thermal conductivity which is adjacent the inner wall and which prevents the spreading out of the charge material subsequently introduced up to the inner wall of the furnace. As the material of low thermal conductivity there may be used materials consisting mainly of carbon, in a state of fine distribution, in particular carbon black or fine coke granules. The application of this insulating layer can be effected in a simple way for example by inserting in the lower part of the shaft furnace a sheet metal casing parallel and concentric to the inner wall and filling the space between the sheet metal casing and the inner wall of the furnace with finely divided material of poor thermal conductivity. The inner space of the sheet metal casing and the remainder of the furnace space is then filled with the charge necessary for the reaction in question, the charge is ignited in the usual way and the reaction chamber is gradually brought to a high temperature. When the temperature has risen to such an extent that the sheet metal casing melts away, there has been formed from fused and resolidified parts of the charge or reaction products a semisolid wall which confines the reaction space in the lower part of the furnace and prevents the mixing of the insulating material with the charge.

By means of this insulating layer it is possible to keep the space between the furnace wall and the mouth of each nozzle considerably less than when the charge directly adjoins the inner wall usually consisting of carbon bricks. The fact that the carbon bricks are exposed to a less high temperature, by reason of the screening action of the inserted material, than when they are directly exposed to the heat of the reaction chamber, means that a considerably smaller thickness of the inner wall consisting of carbon bricks is sufficient. By the arrangement according to this invention the non-utilized furnace space is therefore reduced, the depth of projection of the nozzles is diminished and the capacity of the reaction chamber, especially with larger dimensions, is considerably increased.

The invention will now be described with reference to the accompanying drawings in which:

Figures 1 and 2 are diagrammatic sectional elevations of one embodiment of the invention, and Figure 3 is a diagrammatic sectional elevation of another embodiment.

Figure 1 shows a shaft furnace 1 of which the lower part 2 is lined with ceramic material 3 and carbon bricks 4 and is provided with nozzles 7. A sheet metal casing 5 is loosely inserted in the furnace 1 concentrically with the furnace wall. The intermediate space between the casing 5 and the inner wall of the furnace 1 is filled with a loose or lightly tamped heap of fine coke granules 6.

Figure 2 shows the same furnace in operative condition. The casing has been melted away and a cuplike semisolid wall 8 has been formed from the reaction materials which prevents any mixing of the insulating heap 6 with the reaction material 9.

In the embodiment shown in Figure 3, the lower part 2 of the shaft furnace 1 has an insulating heap 6 which is protected especially effectively from the charge to be introduced from above because of the preformed casing 5 which confines the heap when the furnace is not yet charged lies flush with the wall of the furnace in the upper part of the same. For this purpose the lower part 2 of the furnace is widened in diameter corresponding to the thickness of the linings 3 and 4 and the insulating layer 6.

What we claim is:

1. In a process for reacting a solid charge material at a high temperature in a shaft furnace with oxygen introduced through nozzles extending inwardly from the wall of said furnace into said charge material to supply the heat of reaction in a central reaction space, the improvement comprising: inserting a preformed temporary casing around said central reaction space, said casing being positioned inwardly from said furnace wall a distance less than the mouth of each of said nozzles to provide an insulating space between said casing and said furnace wall, said casing adapted to melt under the heat of reaction; introducing a finely divided material of poor thermal conductivity into said insulating space; and introducing said charge material into said central reaction space.

2. In a process for reacting a solid charge material at a high temperature in a shaft furnace with oxygen introduced through nozzles extending inwardly from the wall of said furnace into said charge material to supply the heat of reaction in a central reaction space, a semisolid wall being formed during the reaction around said central reaction space by at least one of said charge material and reaction products thereof, the improvement comprising: inserting a temporary sheet metal casing around said central reaction space, said casing being positioned inwardly from said furnace wall a distance less than the mouth of each of said nozzles to provide an insulating space between said casing and said furnace wall, said casing adapted to melt under the heat of reaction; introducing a finely divided material of poor thermal conductivity into said insulating space; and introducing said charge material into said central reaction space.

3. In a process for reacting a solid charge material at a high temperature in a substantially cylindrical shaft furnace with oxygen introduced through nozzles extending inwardly from the wall of said furnace into said charge material to supply the heat of reaction in a central reaction space in the lower portion of said furnace, the improvement comprising: inserting a temporary cylindrical sheet metal casing around said central reaction space in the lower portion of said furnace, said casing being positioned inwardly from said furnace walls a distance less than the mouth of each of said nozzles to provide a concentric insulating space between said casing and said furnace wall, said casing adapted to melt under the heat of reaction; introducing a finely divided material of poor thermal conductivity consisting predominantly of carbon into said insulating space; and introducing said charge material into said central reaction space.

4. A process as defined in claim 2 wherein the material introduced into said insulating space is finely divided carbon black.

5. A process as defined in claim 2 wherein the material introduced into said insulating space is a finely granulated coke.

6. In a process for the production of calcium carbide at a high temperature in a shaft furnace into which a charge material of calcium oxide and carbon is introduced for reaction with air enriched with oxygen introduced through nozzles extending inwardly from the wall of said furnace into said charge material to supply the heat of reaction in a central reaction space, the improvement comprising: inserting a temporary sheet metal casing around said central reaction space, said casing being positioned inwardly from said furnace wall a distance less than the mouth of each of said nozzles to provide an insulating space between said casing and said furnace wall, said casing adapted to melt under the heat of reaction; introducing a finely divided material of poor thermal conductivity consisting predominantly of carbon into said insulating space; and introducing said charge material into said central reaction space.

7. A process as defined in claim 6 wherein the carbon material introduced into said insulating space is finely divided carbon black.

8. A process as defined in claim 6 wherein the carbon material introduced into said insulating space is a finely granulated coke.

References Cited in the file of this patent

UNITED STATES PATENTS

| 2,100,843 | Fischer | Nov. 30, 1937 |

FOREIGN PATENTS

| 3,940 of 1899 | Great Britain | Apr. 22, 1899 |
| 501,376 | Canada | Apr. 13, 1954 |